(12) United States Patent
Reischmann

(10) Patent No.: US 6,911,615 B2
(45) Date of Patent: Jun. 28, 2005

(54) WELDING HEAD

(76) Inventor: Leander Reischmann, Rauhenzellerstrasse 26a, 87545 Burgberg-Haeuser (DE)

(*) Notice: Subject to any disclaimer, the term of this patent is extended or adjusted under 35 U.S.C. 154(b) by 60 days.

(21) Appl. No.: 10/415,826

(22) PCT Filed: Oct. 31, 2001

(86) PCT No.: PCT/DE01/04080
§ 371 (c)(1),
(2), (4) Date: May 2, 2003

(87) PCT Pub. No.: WO02/36298
PCT Pub. Date: May 10, 2002

(65) Prior Publication Data
US 2004/0011766 A1 Jan. 22, 2004

(30) Foreign Application Priority Data
Nov. 2, 2000 (DE) .......................... 100 54 387
Feb. 19, 2001 (DE) .......................... 101 08 032
Jun. 5, 2001 (DE) .......................... 101 27 112

(51) Int. Cl.[7] .................. B23K 11/11; B23K 11/24
(52) U.S. Cl. ................... 219/86.51; 219/91.1
(58) Field of Search ............... 219/86.51, 91.1, 219/109, 110

(56) References Cited
U.S. PATENT DOCUMENTS 2,851,584 A * 9/1958 Sciaky .................... 219/86.41
4,419,558 A * 12/1983 Stiebel .................... 219/109
5,063,279 A * 11/1991 Rossi ..................... 219/86.51
5,138,127 A * 8/1992 Fries et al. ............... 219/86.51
5,360,958 A * 11/1994 Bogue et al. ............. 219/86.51
5,386,092 A   1/1995 Dufrenne
5,478,982 A   12/1995 Kirker
6,062,458 A * 5/2000 Edwards .................. 227/152
6,064,028 A * 5/2000 Schmid-Doernte ........ 219/86.41
6,313,427 B1 * 11/2001 Suita ..................... 219/109

FOREIGN PATENT DOCUMENTS

| DE | 32 41 897 A1 | 6/1983 | |
|----|----|----|----|
| DE | 35 27 647 A1 | 3/1987 | |
| DE | 36 41 545 A1 | 5/1989 | |
| DE | 43 23 148 A1 | 1/1995 | |
| DE | 197 38 647 A1 | 3/1999 | |
| DE | 199 55 017 A1 | 5/2001 | |
| EP | 0 419 849 A1 | 4/1991 | |
| GB | 2 268 730 A | 1/1994 | |
| JP | 59-156583 | * 9/1984 | B23K/11/10 |
| JP | 2-84276 | * 3/1990 | B23K/11/11 |
| JP | 6-23562 | * 2/1994 | B23K/11/24 |

* cited by examiner

Primary Examiner—Kevin P. Kerns
(74) Attorney, Agent, or Firm—Venable LLP; Catherine M. Voorhees

(57) ABSTRACT

A welding head for connecting weld members by resistance welding includes an infeed cylinder having a piston rod, an electrode movable via the cylinder; and a sensor arranged between the piston rod of the infeed cylinder and a readjusting spring for the rapid readjustment of the electrode. The sensor is clamped in place between contact means in a sleeve-shaped or tubular drive shaft mounted in a housing.

20 Claims, 4 Drawing Sheets

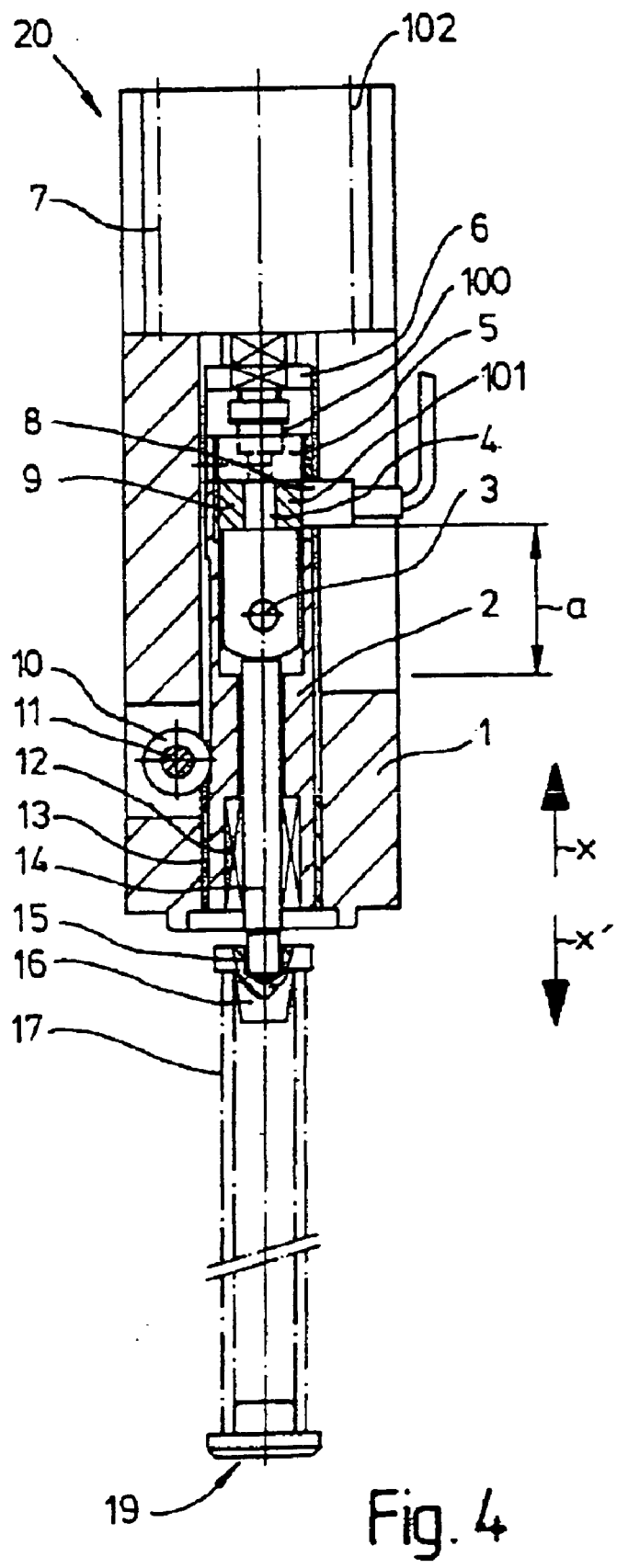
Fig. 4
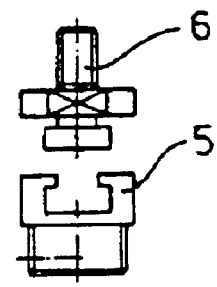
Fig. 5
Fig. 6

WELDING HEAD

BACKGROUND OF THE INVENTION

The invention relates to a welding head for connecting weld members by resistance welding.

Such welding heads are used in devices for resistance welding. Due to the large number of cycles with which welding heads work as a rule in such devices, and due to the high demands imposed on the quality of the individual welds, it is important to monitor the faultless functioning of a welding head. A displacement measurement by means of a sensor is known from the prior art in the field of microwelding technology for monitoring a welding head. In this way, the length of the stroke or the distance traversed by the electrode can be measured. For example, the depression displacement of the electrode can be concluded from the measured value. A disadvantage with such monitoring is that a multiplicity of other parameters which cannot be detected by the displacement measurement still have an effect on the quality of the welding. Furthermore, it is known in the case of large welding heads having thick electrodes to arrange a pressure sensor in the region of an electrode. A disadvantage here is that the sensor, on account of its proximity to the welding point, is exposed to high temperatures and is subjected to high mechanical loads, since every load on the electrode acts directly on the latter. A sound weld is only ensured when the welding machine also has no shortcomings. For this reason, it is necessary to check the following wearing parts of the welding head for their function during each weld.

The guide shaft, which is used for the force transmission between the piston of the drive cylinder and the electrode, must be monitored for ease of motion.

The readjusting spring is to be monitored for changes such as material fatigue or fracture.

The infeed cylinder is to be checked for tightness and friction.

The reliable clamping of the electrodes, e.g. in particular after an electrode change, is likewise to be monitored.

Furthermore, welding heads with welding guns are known in which the two movable welding-gun elements, to which the electrodes are fastened, are arranged on two guides running offset from one another. A disadvantage with such welding guns is that the welding-gun elements act with different torques on the guides, which absorb the torques to the greatest possible extent, since the distance between the respective electrode (the force acts here) and the respective guide is different. This leads to hindrance of the ease of motion of the welding-gun elements, which has an adverse effect on the optimum infeed of the electrodes to the parts to be welded. Such an arrangement of the welding-gun elements is therefore unsuitable for the monitoring of guide shaft, readjusting spring, infeed cylinder and clamping of the electrodes or of the welding operation.

SUMMARY OF THE INVENTION

The object of the invention is to develop, for microwelding technology, a welding head which permits monitoring of the ease of motion of the guide shaft, of the readjusting spring, of the functioning of the infeed cylinder, of the clamping of the electrodes, and thus of the welding operation with simple means and also permits the use of this monitoring at welding guns fitted with a welding head.

This object is achieved according to the invention by a welding head for connecting weld members comprising an infeed shaft, an electrode movable via a cylinder, a sensor arranged between a piston rod of an infeed cylinder and a spring or a readjusting unit, respectively. Advantageous and expedient developments are specified in the subclaims.

By the use of the force measurement between the cylinder and the readjusting spring, the quality of each weld is controlled by monitoring the pressure profile and/or the maximum pressure during resistance welding with microwelding technology. In this way, high scrap rates due to faults which have remained unnoticed, for example, during a pure displacement measurement, such as, for example, too slow readjustment of the readjusting spring or inadequate clamping of the electrode fastened thereto, are prevented. Thus the yield of a welding machine equipped with such a welding head is considerably improved. Due to the often different material properties of the components to be welded, considerable importance is attached to ensuring a continuous welding force at the electrodes. The rapid readjustment of the electrodes during the introduction of the welding current depends on the ease of motion of the guide shaft, on the functioning of the readjusting spring, on the functioning of the infeed cylinder and on the reliable clamping of the electrodes. 100% monitoring of all the functions of the welding head is possible by means of the centrally arranged pressure sensor. Thus, continuity of the quality of the welds is ensured and at the same time documentation of each weld for the quality control is possible via the "good" signal of the force measurement. In other words, the force or pressure measurement is effected between a pressure-exerting and a pressure-transmitting component. The expression "a pressure-exerting component" refers, for example, to the cylinder or its piston. The pressure-transmitting components include, for example, the readjusting spring. By such interposition of the pressure sensor, it is possible to monitor the pressure-exerting components and the pressure-transmitting components, since both are connected to the pressure sensor and act on the latter. The pressure-transmitting components act on the sensor virtually with a counterpressure, which originates from the electrode resting on the workpiece. The sensor is therefore clamped in place between the pressure-exerting and the pressure-transmitting components.

Furthermore, the effect of loads originating from the electrode on the sensor is damped by the interposition of the readjusting spring. As a result, the sensor is protected. Monitoring of cylinder and guide shaft is possible by direct contact of the sensor with these components.

By the measures according to the invention, it is possible to carry out the measurement of the electrode force directly at the electrode irrespective of the size, i.e. of the cross section and the shape of the electrode, and/or of the cylinder size used. Hitherto the direct measurement was only possible in the case of large electrodes. In contrast to the known systems, the force measurement is direct. In known systems for microwelding technology, a force measurement is only possible indirectly via pneumatic pressure and the cylinder size ($F = p \times A$). However, since the electrode force is a process parameter which must be adhered to as the primary factor in achieving a sound welded joint, it is important to know the exact electrode force and this is therefore decisive for a sound weld. The direct force measurement also enables the electrode force to be controlled when using "servo pressure control valves". A direct comparison between actual value and setpoint is possible. Thus the precondition for force control is provided.

Furthermore, such recording of the electrode force permits 100% documentation of the electrode forces.

A welding head is a construction unit which comprises an electrode and a drive acting on the latter. A linear drive which moves the electrode toward and away from a workpiece is preferably used in this case. A second fixed electrode is as a rule arranged opposite the electrode arranged on the welding head, the workpiece to be welded resting on this second fixed electrode during the welding operation. A welding gun is a device which has at least one drive which moves two opposite electrodes toward and away from one another. A welding gun therefore comprises the individual components of one or two welding heads or can be regarded as a welding head which has a common drive for two electrodes.

Due to the arrangement of the welding-gun elements on a common shaft, the welding guns exert identical torques on the shaft. In this way, the shaft is uniformly loaded. By the welding-gun elements being connected to form a C-frame or a bridge, the opposed torques are absorbed in the frame or the bridge to the greatest possible extent and do not cause any canting of the welding-gun elements on the shaft, so that optimum ease of motion of the welding-gun elements on the shaft or guide is ensured.

BRIEF DESCRIPTION OF THE DRAWINGS

Further details of the invention are described in the drawing with reference to a schematically represented exemplary embodiment. In the drawing:

FIG. 4 shows a partially sectioned side view of a force-measuring unit, FIG. 5 shows the cylinder coupling shown in FIG. 1 as an individual detail, and FIG. 6 shows the turned part shown in FIG. 1 as an individual detail.

DETAILED DESCRIPTION OF THE PREFERRED EMBODIMENTS

Figure 1:
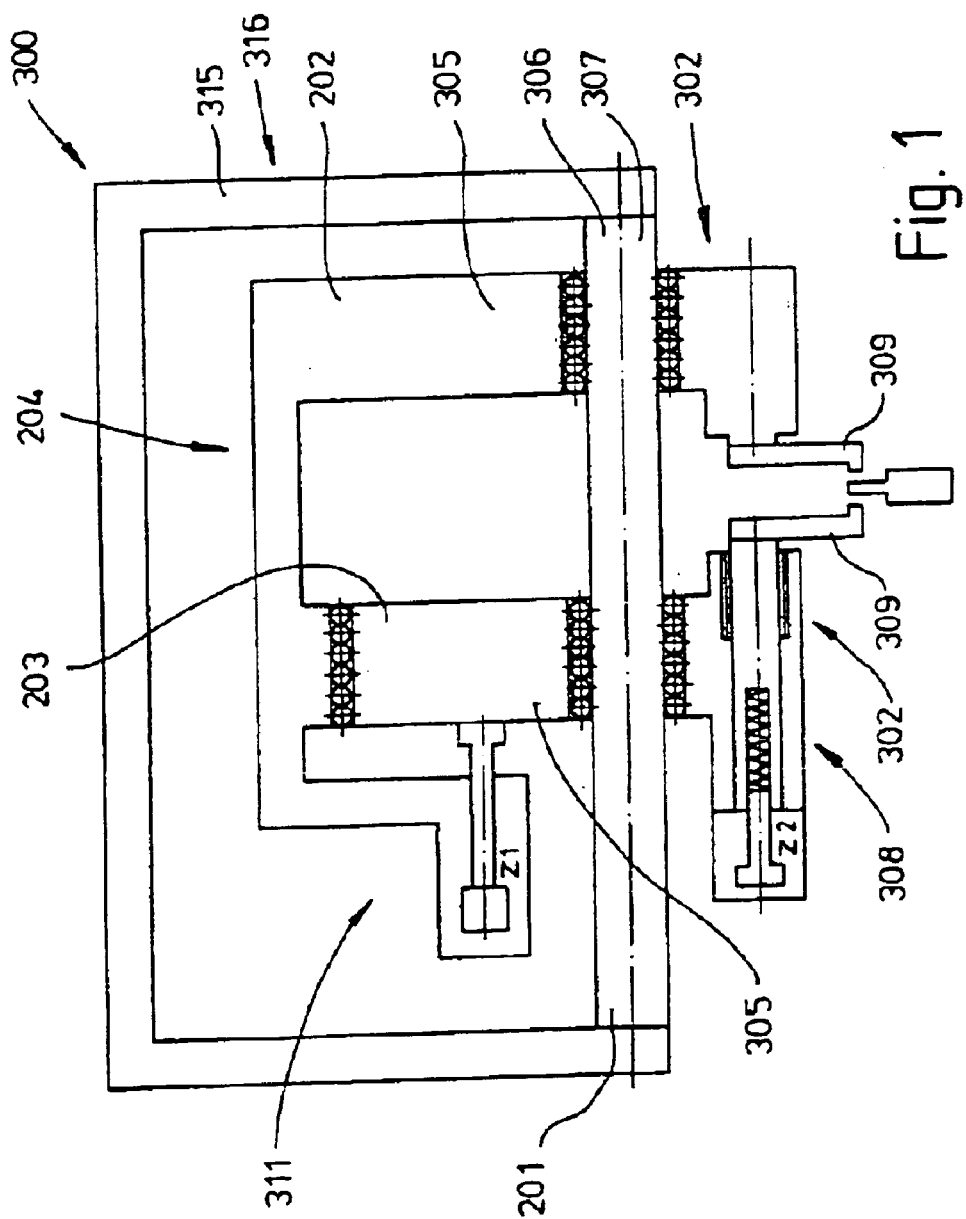
FIG. 1 shows a schematic representation of a welding head with welding-gun elements.
Figure 2:
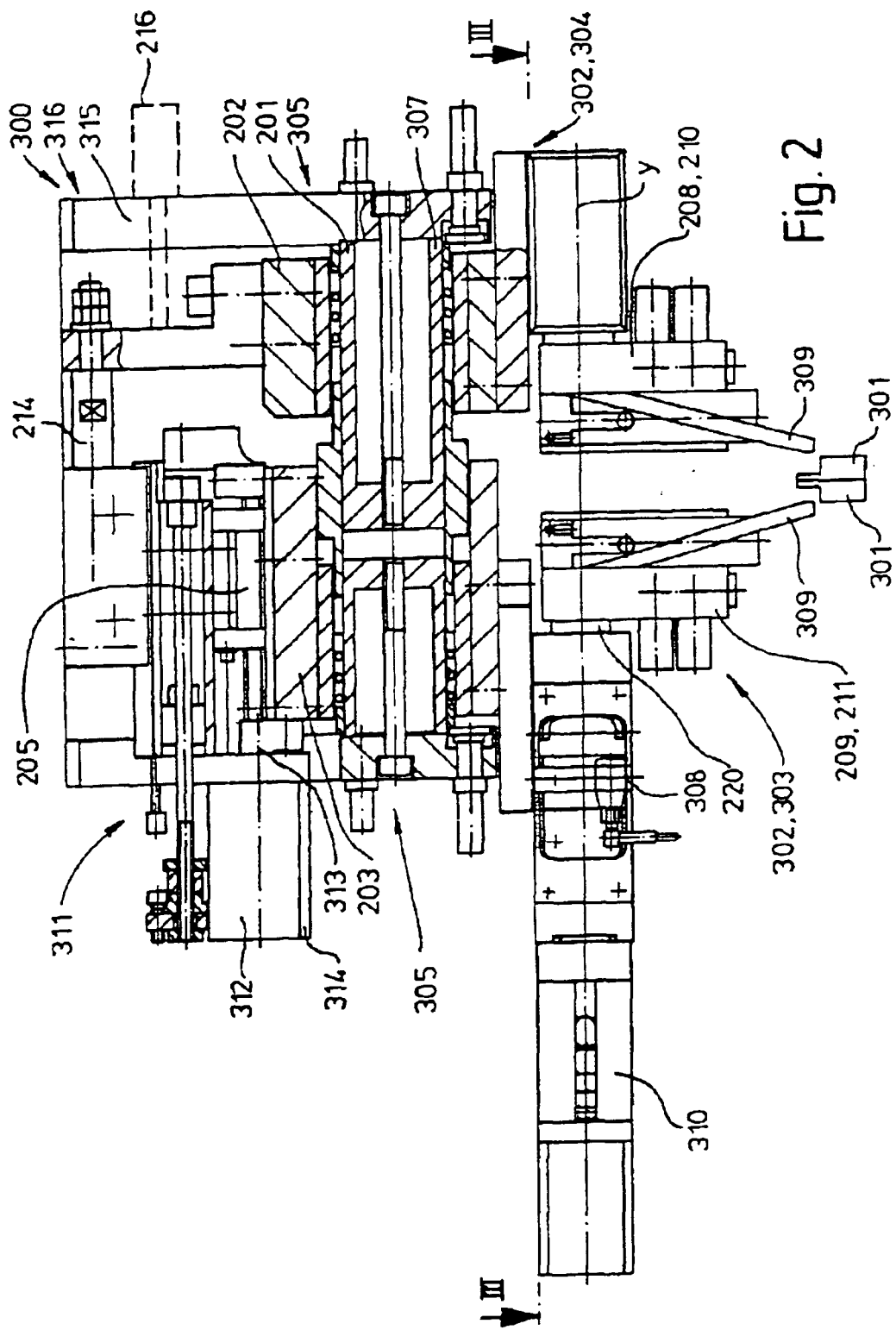
FIG. 2 shows a detailed representation of the welding head shown in FIG. 1.
Figure 3:
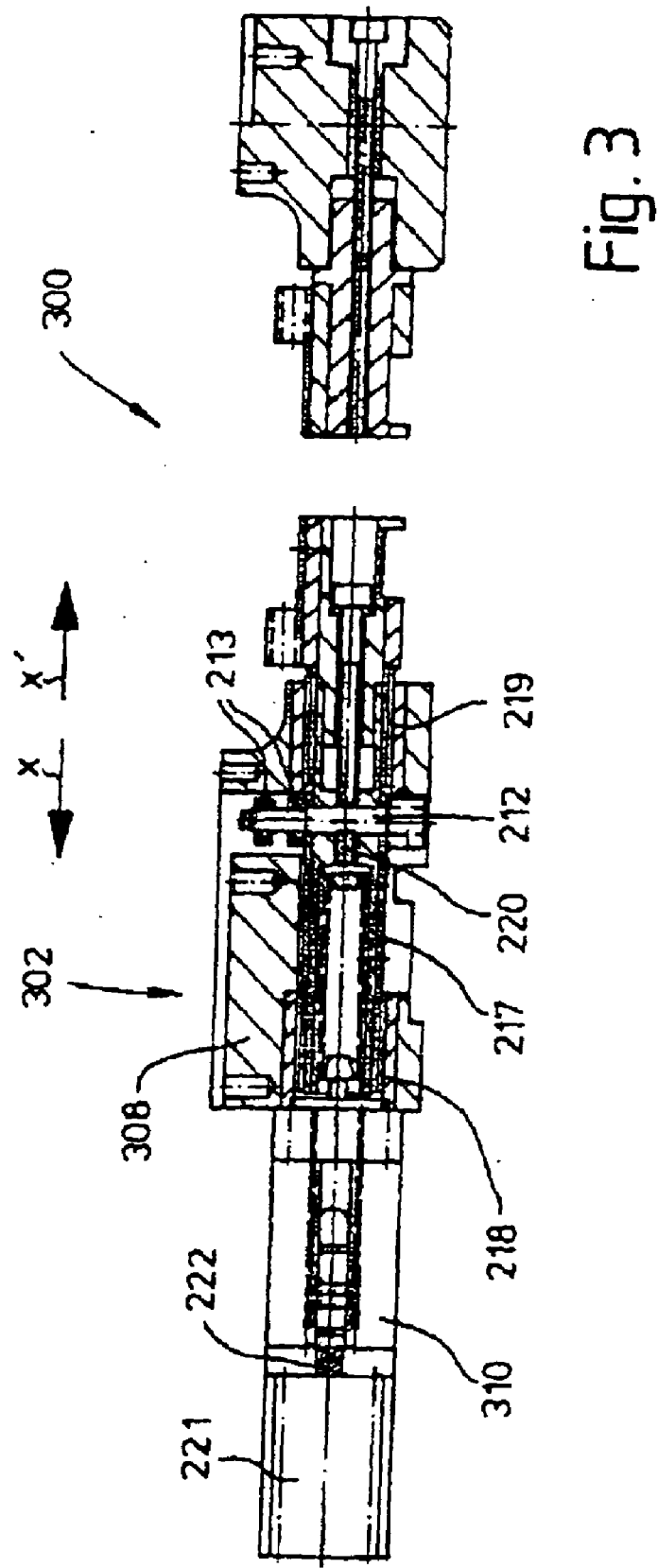
FIG. 3 shows a partial section through the welding head shown in FIG. 2 along section line III—III.

A welding head 300 is schematically shown in FIG. 1. The welding head 300 comprises two welding-gun elements 302, which hold electrodes 309, two guide slides 305, a guide means 306, which is designed as a common shaft 307, a drive-cylinder unit 311 with a piston rod 313, a readjusting unit 308 with a force-measuring device 310 (see FIG. 2), and a housing 315. The housing 315 and the shaft 307 form a unit 316 on which the other components mentioned are traversable along the shaft 307. The welding head 300 shown in FIG. 1 is shown in detail in FIGS. 2 and 3. In the schematic FIG. 1. z1 depicts the drive cylinder 312 (see FIG. 2) and z2 depicts the infeed cylinder 221 (see FIG. 3).

All the dynamic or movable elements of the welding head 300 are mounted in an easily displaceable or floating manner on the shaft 307, which is designed as a transverse shaft 201. The transverse shaft 201 is connected to the housing 315 in a positive-locking manner. The two transverse blocks 202 and 203 form a C-shaped frame 204 (see in particular FIG. 1) displaceable on the transverse shaft 201. By the guide carriage 205 (see FIG. 2), it is additionally possible to displace only the transverse block 203 to the right by means of the pneumatic cylinder 312. A readjusting unit 308 with force-measuring device 310 and an electrode holder 209 and respectively an electrode holder 208 are flange-mounted on the underside of the transverse blocks 202 and 203 or on a first welding-gun element 303 and a second welding-gun element 304. A cylinder housing 314 of the drive-cylinder unit 311 may move the second welding-gun element 304. According to requirements, the welding head 300 may also be equipped with two readjusting units or with two electrode holders without a readjusting unit. A guide shaft 220 of the readjusting device 308 is connected to the welding-gun element 302 in a positive-locking manner by a transverse pin 212 and can be displaced by an infeed cylinder 221 with a piston rod 222 in arrow direction x, x'. The transverse pin 212 is provided with two ball bearings 213 and serves as an anti-rotation locking means for the guide shaft 220. All the length measurements or displacement measurements are picked off at the transverse pin 212, since the latter, due to its positive locking with the guide shaft 220, delivers reliable or undistorted data to the length-measuring system or displacement-measuring system. Furthermore, the additional plastic sleeve 217 ensures that the ball cages 218 and 219 of the guide shaft 220 are pressed into their initial positions during each stroke of the readjusting unit 308. Blocking of the readjusting unit 308 due to slipping of the ball cages 218 and 219 is therefore prevented. The electrode holders 208, 209 or the coolable electrode holders 210, 211 are pivotable by 180 degrees about a longitudinal axis y. Resistance welding is therefore also made possible at welding points where access is difficult by a simple setting or pivoting of the electrode holders 208, 209 or 210, 211. Weld members 301 to be welded are arranged between the electrodes 309 during operation of the welding head 300. By removal of the connecting bolt 214, the C-frame function can be neutralized at the welding head 300, that is to say that the C-frame 204 can be split. By the attachment of a second infeed cylinder 216 (shown by broken lines), the transverse blocks 202 and 203 or the guide slides 305 or the welding-gun elements 302 can then be operated independently of one another.

A welding head 20 or a force-measuring device for a welding head is shown in FIG. 4. This force-measuring device essentially comprises a housing 1, in which a shaft 2 is mounted, in which a plunger 14 is in turn guided in a ball bearing 12, and a cylinder 7. A force-measuring sensor 9 is fitted in the readjusting-spring infeed shaft 2. The housing 1 is designed in such a way that it can be flange-mounted as an interchangeable component for the welding head 20. A bearing 10 is tangent to the shaft 2 with slight clearance in order to ensure the anti-rotation locking of the shaft 2, this anti-rotation locking being required for the connecting cable 8 of the sensor 9. The sensor 9 is clamped in place and calibrated between turned parts 3 and 5 by means of a cap screw 100 and a centering bush 101. The ball bearing 12 in which the plunger 14 transmits the force to the sensor 9 during operation of the infeed cylinder 7 (the readjusting spring is now compressed) is pressed into the shaft 2 on an underside. The turned part 3 is spherical on the underside in order to prevent any possible force shunts. A spring 17, in the last winding, is pressed onto a turned part 16 arranged on the plunger 14. In addition, an O-ring 15 is pressed into the turned part 16, this O-ring 15 permitting lateral compensation of the position of the spring 17 and ensuring, on the other hand, rapid exchange of the spring 17. An electrode (not shown) is arranged on a free end 19 of the spring 17. The cylinder coupling 6 (also see FIG. 5) is screwed into a cylinder piston of the cylinder 7 and has a collar. It is therefore very simple to exchange the cylinder 7. To this end, fastening screws 102 on the cylinder 7 are released, and the latter is pulled upward and then pulled laterally out of the T-slot of the turned part 5 (also see FIG. 6). The sensor 9 is screwed into the sleeve-shaped or tubular shaft 2 and can be moved with the latter in the housing 1 by a stroke a in the arrow direction x or x'. In the region of the connecting cable 8, the shaft 2 has a slot or a recess. The plunger 14 is connected to the sensor 9 or the shaft 2 via the turned part 3. As a result, all the pressure forces occurring between cylinder 7 and electrode act on the sensor 9, the connection between electrode and sensor 9 being produced essentially by the plunger 14 and the spring 17.

Reference 4 depicts a part of the force-measuring sensor 9. As shown in FIG. 4, reference numeral 11 depicts a bolt for bearing 10, and a sleeve 13 leads the cam 2 in housing 1.

What is claimed is:

1. A welding head for connecting weld members by resistance welding, said welding head comprising:
   an infeed cylinder having a piston rod;
   an electrode movable via the cylinder; and
   a sensor arranged between the piston rod of the infeed cylinder and a readjusting spring for rapid readjustment of the electrode, wherein the sensor is clamped in place between contact means in a sleeve-shaped or tubular drive shaft mounted in a housing.

2. The welding head according to claim 1, wherein the sensor includes a pressure sensor for force measurement.

3. The welding head according to claim 1, wherein the sensor is arranged in the housing of the welding head or in a readjusting unit.

4. The welding head according to claim 1, further comprising a plunger in cooperation with the infeed cylinder wherein the housing at least partly accommodates the shaft and the plunger.

5. The welding head according to claim 1, wherein the sensor is arranged in the shaft.

6. The welding head according to claim 1, wherein the sensor is firmly connected to the shaft.

7. The welding head according to claim 1, wherein the shaft is designed as a readjusting-spring infeed shaft.

8. The welding head according to claim 1, wherein the sensor is clamped in place and calibrated between the contact means with a cap screw and a centering bush.

9. The welding head according to claim 1, wherein the contact means are designed as turned parts.

10. The welding head according to claim 1, wherein the piston rod of the infeed cylinder is coupled to the sensor.

11. The welding head according to claim 1, further comprising welding-gun elements mounted in a longitudinally displaceable manner relative to one another on longitudinally displaceable guide slides wherein, in order to avoid different torques on a guide means which are caused by forces acting on the welding electrodes, the welding-gun elements are mounted on a common shaft.

12. The welding head according to claim 11, the common shaft has a circular cross section.

13. The welding head according to claim 11, wherein the guide slides can travel relative to cue another toward the weld members virtually free of force.

14. The welding head according to claim 11, wherein a separate readjusting unit which corrects the welding electrodes during the welding operation is assigned to at least one welding-gun element.

15. The welding head according to claim 14, wherein the readjusting unit contains a force-measuring device.

16. The welding head according to claim 11, wherein the welding-gun elements are mounted in a floating manner relative to one another on the common shaft and further comprising a drive-cylinder unit arranged to cause the first welding-gun element to be moved by means of a drive-cylinder piston rod and the second welding-gun element to be moved by means of a cylinder housing of the drive-cylinder unit or by means of a drive cylinder.

17. The welding head according to claim 1, wherein the piston rod of the infeed cylinder is coupled to the shaft via a C-guide.

18. A welding gun with two welding electrodes fixed to welding-gun elements wherein the welding-gun elements are mounted in a floating manner relative to one another on a common shaft wherein at least one of the two welding-gun elements carries a welding head according to claim 1.

19. A welding head for connecting weld members by resistance welding, said welding head comprising:
   an infeed cylinder having a piston rod;
   an electrode movable via the cylinder; and
   a sensor arranged between the piston rod of the infeed cylinder and a plunger with a readjusting spring for rapid readjustment of the electrode, wherein the sensor is clamped in place and calibrated between contact means in a sleeve-shaped or tubular drive shaft mounted in a housing, and wherein the plunger is guided in the drive shaft.

20. The welding head according to claim 1, wherein the sensor is calibrated between the contact means in a sleeve-shaped or tubular drive shaft mounted in a housing.

* * * * *